United States Patent
Zhao et al.

(10) Patent No.: US 11,204,249 B2
(45) Date of Patent: Dec. 21, 2021

(54) POSITIONING METHOD AND ROBOT WITH THE SAME

(71) Applicant: UBTECH ROBOTICS CORP LTD, Shenzhen (CN)

(72) Inventors: Yongsheng Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 260 days.

(21) Appl. No.: 16/396,690

(22) Filed: Apr. 28, 2019

(65) Prior Publication Data

US 2020/0096343 A1    Mar. 26, 2020

(30) Foreign Application Priority Data

Sep. 26, 2018   (CN) .......................... 201811125578.4

(51) Int. Cl.
*G01C 21/20* (2006.01)
*G05D 1/02* (2020.01)

(52) U.S. Cl.
CPC ........... *G01C 21/20* (2013.01); *G05D 1/0212* (2013.01); *G05D 1/0253* (2013.01); *G05D 1/0276* (2013.01)

(58) Field of Classification Search
CPC .... G01C 21/20; G05D 1/0212; G05D 1/0253; G05D 1/0276
See application file for complete search history.

(56) References Cited

U.S. PATENT DOCUMENTS

| | | | | |
|---|---|---|---|---|
| 2004/0158346 A1* | 8/2004 | Dupuis | ............... | G06Q 10/087 700/136 |
| 2004/0168148 A1* | 8/2004 | Goncalves | ........... | G05D 1/0248 717/104 |
| 2009/0154791 A1* | 6/2009 | Yoon | .................. | G06K 9/00664 382/153 |
| 2010/0070125 A1* | 3/2010 | Lee | ........................... | G06T 7/73 701/28 |
| 2013/0060520 A1* | 3/2013 | Amor | .................... | G01C 15/008 702/154 |
| 2014/0118536 A1* | 5/2014 | Morin | ................. | H04N 1/32117 348/135 |
| 2017/0026599 A1* | 1/2017 | He | ....................... | H04N 5/35721 |
| 2018/0120106 A1* | 5/2018 | Sato | ......................... | G06T 17/05 |
| 2018/0217510 A1* | 8/2018 | Wells | .................. | G03F 7/70775 |

* cited by examiner

*Primary Examiner* — Jeff A Burke
*Assistant Examiner* — Arslan Azhar

(57) ABSTRACT

The present disclosure provides a positioning method and a robot with the same. The method is applied to a robot having a camera, the method includes: taking a photo of a predetermined area, wherein the predetermined area comprises a marker pattern area; identifying at least two marker points of the marker pattern area and obtaining first coordinate data of each marker point; calculating second coordinate data of the robot in a world coordinate based on parameters of the camera and the first coordinate data of the marker points; and calculating angle data of the robot in the world coordinate based on the first coordinate data of the marker points and the second coordinate data of the robot in the world coordinate. Through the above-mentioned positioning method, the robot can quickly perform monocular visual positioning and reduce the calculation amount of positioning.

14 Claims, 8 Drawing Sheets

POSITIONING METHOD AND ROBOT WITH THE SAME

CROSS REFERENCE TO RELATED APPLICATIONS

This application claims priority to Chinese Patent Application No. 201811125578.4, filed Sep. 26, 2018, which is hereby incorporated by reference herein as if set forth in its entirety.

BACKGROUND

1. Technical Field

The present disclosure relates to robot technology, and particularly to a positioning method and a robot with the same.

2. Description of Related Art

With the development of the technologies of sensor, networking and image, vision-based positioning technology has become a rapidly developed new subject, which has been more and more widely used in the technologies of robot navigation, the positioning and grabbing of aviation and aerospace vehicles, virtual reality, and the like.

Positioning technologies include monocular positioning technology, binocular positioning technology, and multicular positioning technology. Among them, the monocular positioning technology is widely used in the positioning of micro-robots due to its simple system and low cost.

However, due to the small size of micro-robots, the calculation amount for positioning technology is a large overhead for the processor of a micro-robot.

BRIEF DESCRIPTION OF THE DRAWINGS

To describe the technical schemes in this embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

Figure 1:
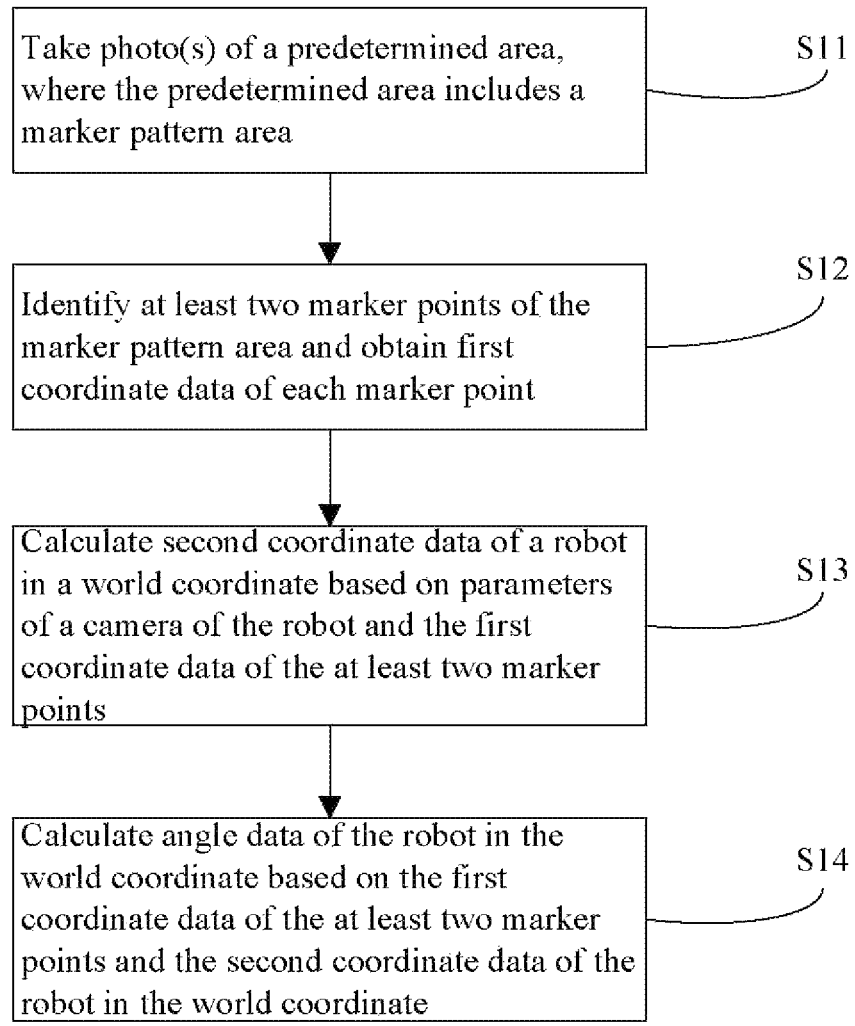
FIG. 1 is a flow chart of a first embodiment of a positioning method according to the present disclosure.
Figure 2:
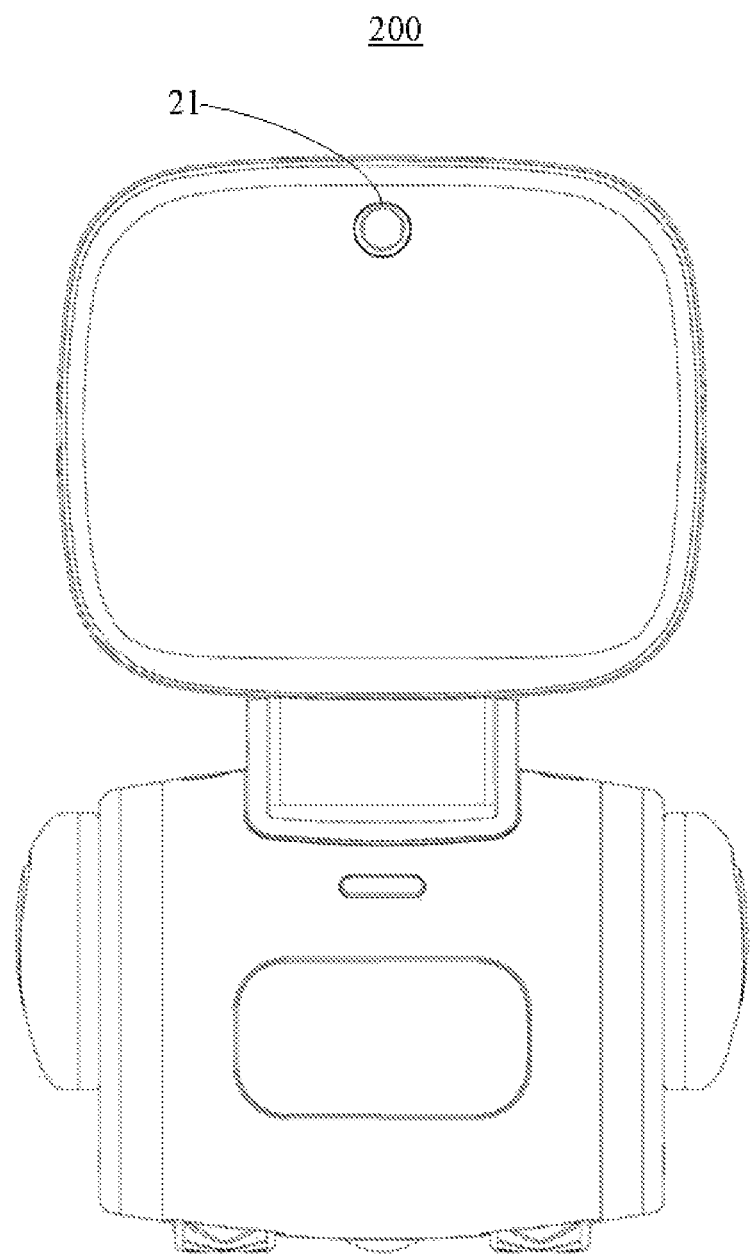
FIG. 2 is a schematic block diagram of the structure of a robot for the positioning method shown in FIG. 1.

FIG. 1 is a flow chart of a first embodiment of a positioning method according to the present disclosure. FIG. 2 is a schematic block diagram of the structure of a robot for the positioning method shown in FIG. 1. Referring to FIG. 1 and FIG. 2, in this embodiment, the positioning method is applied to a robot 200. As shown in FIG. 2, the robot 200 includes at least a camera 21 disposed on, for example, a head portion of the robot 200. In the robot 200, a position and an angle of the camera 21 approximate a position and an angle of the robot 200 as a whole, respectively. Through the positioning method of this embodiment, a pose (e.g., a position and a posture) of the robot 200 with respect to a coordinate system of a map can be obtained.

As shown in FIG. 1, the positioning method includes the following steps.

S11: taking photo(s) of a predetermined area, where the predetermined area includes a marker pattern area.

In this embodiment, the marker pattern area is where the robot 200 locates. The robot 200 is placed on a marking tool (not shown), where the marking tool is a marking plate or marking paper having a checkerboard. The marker pattern area is included in the marking tool, where the robot 200 is placed in the marker pattern area.

In this embodiment, the robot 200 is placed at the center of the marker pattern area. The photo(s) are took through the camera 21 disposed on the robot 200. The camera 21 obtains the photo(s) of the marker pattern area from different angles and different distances, where at least a part of a marker pattern should be shown in the photo(s). In other embodiments, the robot 200 may be placed at any other position within the marker pattern area.

S12: identifying at least two marker points of the marker pattern area and obtaining first coordinate data of each marker point.

In this embodiment, the robot 200 identifies the at least two marker points of the marker pattern area in the photo(s), and obtains the first coordinate data of the identified marker points, where the first coordinate data of each marker point includes at least coordinate data (e.g., the coordinate) of the marker point in the world coordinate.

S13: calculating second coordinate data of the robot in a world coordinate based on parameters of the camera and the first coordinate data of the at least two marker points.

In this embodiment, the parameters of the camera 21 include feature (technical) parameters of the camera 21 itself and configured parameters of the camera 21 at the time of taking the photo(s), for example, focal length, magnification, resolution, and the like. The robot 200 can calculate the second coordinate data of the robot 200 in the world coordinate by means of optical principles, coordinate conversion, or the like based on the parameters (internal and external parameters) of the camera 21 and the first coordinate data of the marker points identified in step S12. In which, the internal parameters include the feature parameters of the camera 21 itself and the configured parameters of the camera 21 at the time of taking the photo(s), and the external parameters include a positional relationship between an optical center of the camera 21 and a robot coordinate of the robot 200.

S14: calculating angle data of the robot in the world coordinate based on the first coordinate data of the at least two marker points and the second coordinate data of the robot in the world coordinate.

In this embodiment, the robot 200 calculates the angle data of the robot 200 in the world coordinate based on the first coordinate data of the at least two marker points in the world coordinate and the second coordinate data of the robot 200 in the world coordinate. The robot 200 converts the angle data in the world coordinate into pose data of the robot 200, where the position and the angle of the camera 21 approximate the position and the angle of the robot 200 as a whole, respectively. The pose data of the robot 200 can be displayed by a display screen (not shown) of the robot 200 itself, or can be transmitted to a cloud server or a computer for storage and processing via wireless transmission. The pose data may include a position data and a posture data of the robot 200, where the position data may include a coordinate of the robot 200, and the posture data may include an angle of the robot 200.

For instance, the robot 200 can calculate the angle of the robot 200 in the world coordinate using the trigonometric function and the cosine theorem based on the first coordinate data of the at least two marker points in the world coordinate and the second coordinate data of the robot 200 in the world coordinate.

In the positioning method of this embodiment, the robot 200 obtains at least the first coordinate data of the marker point in the world coordinate through the taken photo(s), then obtains the second coordinate data of the robot 200 in the world coordinate based on the first coordinate data of the marker points in the world coordinate, and finally obtains the angle data and the pose data of the robot 200 based on the first coordinate data and the second coordinate data. Through the above-mentioned positioning method, when the robot 200 performs monocular visual positioning, the calculation amount of coordinate conversion can be reduced by recognizing the coordinate data of the marker points.

Figure 3:
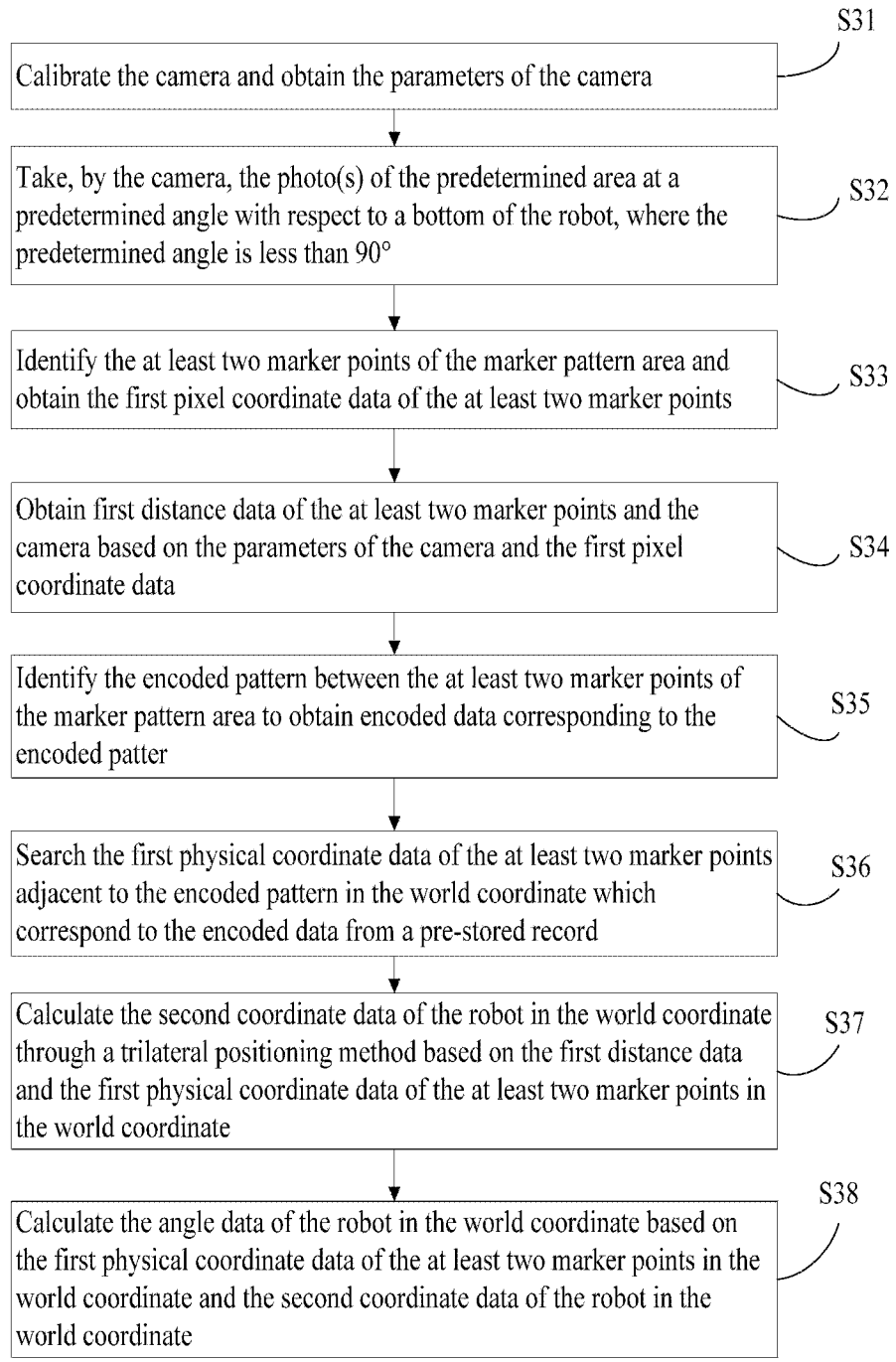
FIG. 3 is a flow chart of a second embodiment of a positioning method according to the present disclosure.
Figure 4:
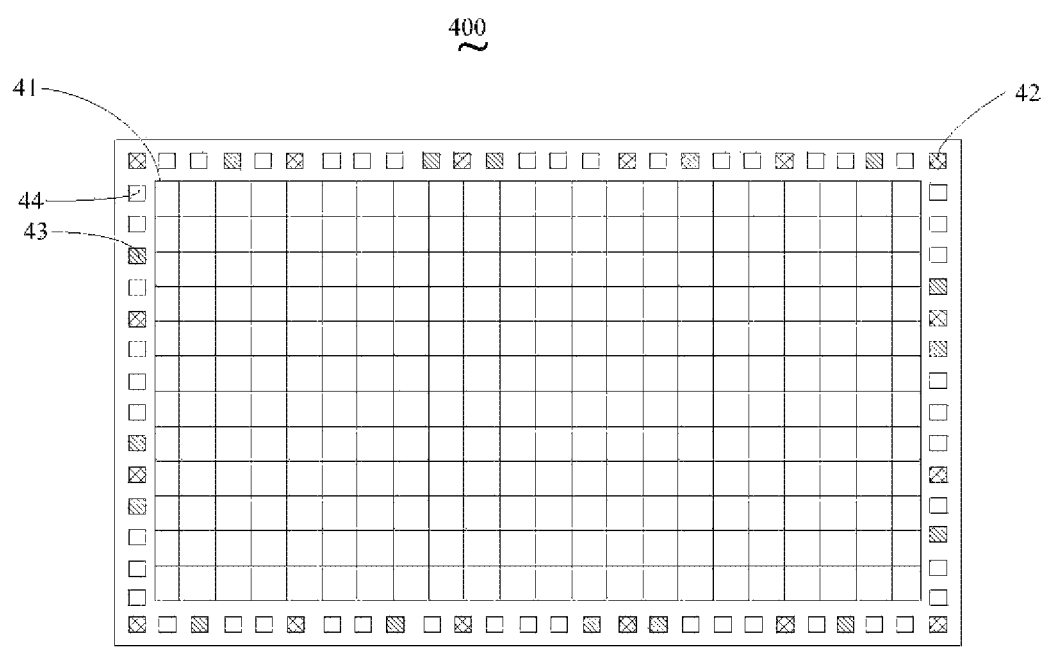
FIG. 4 is a schematic block diagram of a marker pattern area in the positioning method shown in FIG. 3.

The present disclosure further provides another positioning method. FIG. 3 is a flow chart of a second embodiment of a positioning method according to the present disclosure. FIG. 4 is a schematic block diagram of a marker pattern area in the positioning method shown in FIG. 3. Referring to FIG. 3 and FIG. 4, in this embodiment, the positioning method is also applied to the robot 200. For the structure of the robot 200, please refer to FIG. 2, which is not described herein.

As shown in FIG. 3, in this embodiment, the positioning method includes the following steps.

S31: calibrating the camera and obtaining the parameters of the camera.

In this embodiment, the parameters of the camera 21 include at least a magnification, a resolution, a focal length, and the like.

S32: taking, by the camera, the photo(s) of the predetermined area at a predetermined angle with respect to a bottom of the robot, where the predetermined angle is less than 90°.

In this embodiment, the camera 21 takes the photo(s) of the predetermined area at the fixed predetermined angle with respect to the bottom of the robot, where the predetermined angle is less than 90°. The magnitude of the predetermined angle depends on the size of the marker pattern area of the marking tool and the placement position of the robot 200. For instance, the camera 21 takes the photo(s) of the marker pattern area in accordance with the predetermined angle from each angle and each position.

S33: identifying the at least two marker points of the marker pattern area and obtaining the first pixel coordinate data of the at least two marker points.

In this embodiment, the robot 200 obtains the first pixel coordinate data of the at least two marker points on the taken photo(s) by identifying the at least two marker points of the marker pattern area through the taken photo(s), where the first pixel coordinate is a two-dimensional coordinate of the marker points in a pixel coordinate system.

S34: obtaining first distance data of the at least two marker points and the camera based on the parameters of the camera and the first pixel coordinate data.

In this embodiment, the robot 200 calculates the coordinate of the marker points in the robot coordinate based on the parameters of the camera 21 and the first pixel coordinate of the marker points, thereby obtaining the distance of the marker points to the robot 200.

For instance, by taking the coordinate of the optical center of the camera 21 as the origin, the first pixel coordinate of each marker point can be converted into a physical coordinate (the physical coordinate of the marker points in the robot coordinate) with respect to the optical center based on the parameters of the camera 21. The optical center and the physical coordinates of the marker point can be connected by a straight line. According to the height of a corresponding position of the marker point (e.g., the map plane or a certain known height), the intersection of the straight line and the plane, that is, the physical coordinates of the marker points with respect to the coordinate system of the optical center of the camera 21, is calculated. Then, the first pixel coordinate of the marker point is converted into a coordinate in a robot coordinate system based on the positional relationship between the optical center of the camera 21 and the robot 200.

For instance, for example, if the first pixel coordinate of a marker point is (u, v), the robot 200 first converts the first pixel coordinate (u, v) into a first image coordinate (x, y), where an image coordinate system takes the center of a CCD image plane as the origin, and the X and the Y axes are parallel to the two vertical sides of the image plane, respectively, and the coordinate is represented by (x, y). The conversion relationship between the first pixel coordinate (u, v) and the first image coordinate (x, y) is as follows:

$$\begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} x \\ y \\ 1 \end{bmatrix};$$

where, $(u_0, v_0)$ is the coordinate of the origin of the image coordinate system in the pixel coordinate system, and dx and dy are the physical dimensions of each pixel in the x and the y directions of the image plane, respectively.

The conversion relationship for the robot 200 to convert the first image coordinate (x, y) of the marker point into the coordinate $(X_C, Y_C, Z_C)$ of the marker point in the robot coordinate system is as follows:

$$Z_C \begin{bmatrix} x \\ y \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} X_C \\ Y_C \\ Z_C \\ 1 \end{bmatrix};$$

where, f is the focal length of the camera 21.

The robot 200 calculates a distance between the coordinate $(X_C, Y_C, Z_C)$ of the marker point in the robot coordinate system and the origin (0, 0, 0) of the robot coordinate system so as to obtain the first distance data of the marker point and the camera 21.

In this embodiment, the position and the angle of the camera 21 approximate the position and the angle of the robot 200 as a whole, and the physical coordinate of the marker points with respect to the optical center of the camera 21 approximates the physical coordinate of the marker points in the robot coordinate system. In other embodiments, the position and the angle of the camera 21 may be not approximated to the position and the angle of the robot 200 as a whole, respectively, and the physical coordinate of the marker points in the robot coordinate system can be obtained by performing a simple three-dimensional coordinate system conversion on the physical coordinate of the marker points with respect to the optical center of the camera 21, which is not described herein.

S35: identifying the encoded pattern between the at least two marker points of the marker pattern area to obtain encoded data corresponding to the encoded pattern.

In this embodiment, the robot 200 identifies the encoded pattern between the at least two marker points of the marker pattern area in the photo(s) to obtain the encoded data corresponding to the encoded pattern.

For instance, the encoded pattern may include at least two code blocks. If the color, amount, and/or arrangement order of the code blocks are different, the corresponding encoded data is also different. In this case, step S35 may include identifying a color, an amount, and/or an arrangement order of the code blocks between the at least two marker points of the marker pattern area to obtain the encoded data corresponding to the encoded pattern.

FIG. 4 is a schematic block diagram of a marker pattern area of the positioning method shown in FIG. 3. As shown in FIG. 4, in the inner contour of a marker pattern area 400, a checkerboard 41 is provided, and the robot 200 is placed at the center intersection or any intersection of the board 41. In the outer contour of the marker pattern area 400, a plurality of marker points 42 are provided, and n code blocks are disposed between each two marker points 42, where n code blocks include n1 first code blocks 43 and n2 second code blocks 44. In each of the four vertices of the outer contour of the marker pattern area 400, the marker point 42 has to be provided. The amount of the code blocks between each two adjacent marker points 42 should be the same. The distance between each two adjacent marker points 42 may be the same or different, and the distance between each two adjacent code blocks may be the same or different, which are not necessary to correspond to the grids of the checkerboard 41.

When the shapes of the first code blocks 43 and the second code blocks 44 are the same, they are distinguished by color, for example, the first code blocks 43 are black code blocks, the second code blocks 44 are white code blocks; when the colors of the first code blocks 43 and the second code blocks 44 are the same, they are distinguished by shape, for example, the first code blocks 43 are rectangles, and the second code blocks 44 are triangles.

The arrangement order of the code blocks is calculated in binary, and the first code blocks 43 and the second code blocks 44 can be regarded as n-bit binary codes, for example, the first code blocks 43 are "1" and the second code blocks 44 are "0", and n code points can compose up to $2^n$ kinds of codes. At the time of encoding, the appropriate value of n is selected according to the total length of the desired marker pattern area 400 and the appropriate distance between two marker points 42.

Figure 5:
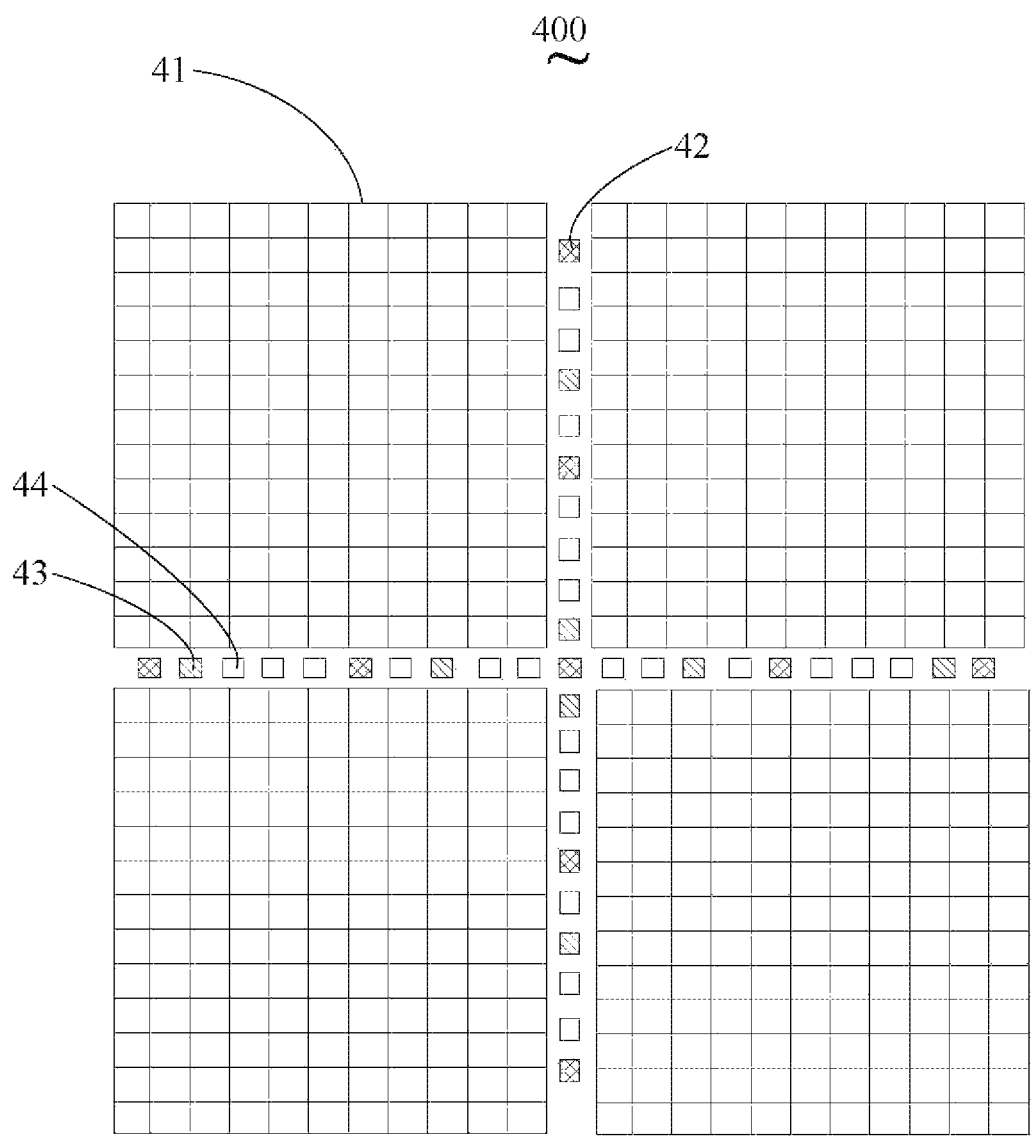
FIG. 5 is a schematic block diagram of another marker pattern area according to the present disclosure.

In other embodiments, the marker pattern area 400 may contain only one code, or may contain a plurality of consecutive codes. The marker pattern is not limited to be at the edge of the marker pattern area 400, which may be inside the marker pattern area 400. The marker patterns are not limited to being connected end to end, but may also cross each other (see FIG. 5). The marker pattern can be provided as parallel to the checkerboard 41 or perpendicular to the checkerboard 41, which is not described herein.

S36: searching the first physical coordinate data of the at least two marker points adjacent to the encoded pattern in the world coordinate which correspond to the encoded data from a pre-stored record.

In this embodiment, based on the encoded data obtained in step S35, the robot 200 searches for its corresponding first physical coordinate data of the at least two marker points adjacent to the encoded pattern in the world coordinate from a pre-stored record. The pre-stored record includes a mapping relationship between the encoded data and the physical coordinate of the adjacent marker point(s), and may also include a mapping relationship of marker point pixel data, the encoded pattern, the encoded data, the physical coordinate data, and the like.

The robot 200 may obtain the first physical coordinate data of all the marker points, or obtain the first physical coordinate data of the four marker points of the left and right ends and the upper and lower ends of the photo.

S37: calculating the second coordinate data of the robot in the world coordinate through a trilateral positioning method based on the first distance data and the first physical coordinate data of the at least two marker points in the world coordinate.

In this embodiment, the robot 200 obtains the first distance data and the first physical coordinate data of the marker points in the world coordinate in steps S34 and S36, and then calculates the second coordinate data of the robot 200 in the world coordinate through the trilateral positioning method. The second coordinate data is physical data.

In this embodiment, the first physical coordinate data of three marker points are obtained, and the three marker points are all on a same horizontal plane and the values of the z-coordinate are the same. For example, the coordinates of the three marker points A, B, and C are $A(x1,y1,z1)$, $B(x2,y2,z2)$, and $C(x3,y3,z3)$, respectively. Point A, point B, and point C are respectively taken as the center of a circle to make the circle by taking the nearest distance from each center to the tag to be tested as the radius. The intersection point of the three obtained circles is $D(x, y, z)$. The radius of circle A is d1, the radius of the circle B is d2, and the radius of the circle C is d3. The intersection point $D(x, y, z)$ can be calculated by the following formula:

$$(x-x_1)^2+(y-y_1)^2+(z-z_1)^2=d_1^2$$

$$(x-x_2)^2+(y-y_2)^2+(z-z_2)^2=d_2^2;$$

$$(x-x_3)^2+(y-y_3)^2+(z-z_3)^2=d_3^2$$

where, there are three kinds of relations among circle A, circle B, and circle C: the three circles intersect two by two and have a common area; the three circles intersect two by two but there is no common area; and the three circles do not intersect.

When the three circles have a common area, the common area will have three intersection points, and the coordinate D of the tag to be tested is the coordinate of the inner center of a triangle when the three intersection points are used to make the triangle.

When the three circles intersect two by two but there is no common area, there will have two intersect areas which do not intersect. When taking a midpoint of a line connecting the two intersection points of the intersect area of each two circles, and using the three midpoints to make a triangle, then the inner center of the triangle which is the inner coordinate D of the tag to be tested will be obtained.

When the three circles do not intersect, they are discard and adopt the next set of three marker points; if the intersection cannot be found in three sets of three marker points, the position of three markers is used to make a triangle, and the inner center of the triangle is the coordinate D of the tag to be tested.

In other embodiments, the robot 200 may obtain two marker points. According to the trilateral positioning method, there may be two intersection points for two circles, and the calculated coordinate D of the tag to be tested has two results. According to the prior information of the map, the marker points which the intersection points are within the marker pattern area (on the marker pattern area) are considered as valid and the marker points which the intersection points are outside the marker pattern area are considered as invalid, and one of the coordinates is discarded.

S38: calculating the angle data of the robot in the world coordinate based on the first physical coordinate data of the at least two marker points in the world coordinate and the second coordinate data of the robot in the world coordinate.

In this embodiment, the technical feature of step S38 is substantially the similar to the technical feature of the above-mentioned step S14, which is not described herein.

Based on the positioning method of the above-mentioned embodiment, in this embodiment, the robot 200 obtains first distance data of the marker points and the camera based on the parameters of the camera and the first pixel coordinate data; identifies the encoded pattern between the marker points to obtain the encoded data and searches the first physical coordinate data of the marker points in the world coordinate through the encoded data; and calculates the second coordinate data of the robot in the world coordinate through the trilateral positioning method based on the first distance data and the first physical coordinate data of the marker points in the world coordinate. Through the above-mentioned positioning method, when the robot 200 performs monocular visual positioning, the calculation amount of coordinate conversion can be reduced by recognizing the coordinate data of the marker points.

Figure 6:
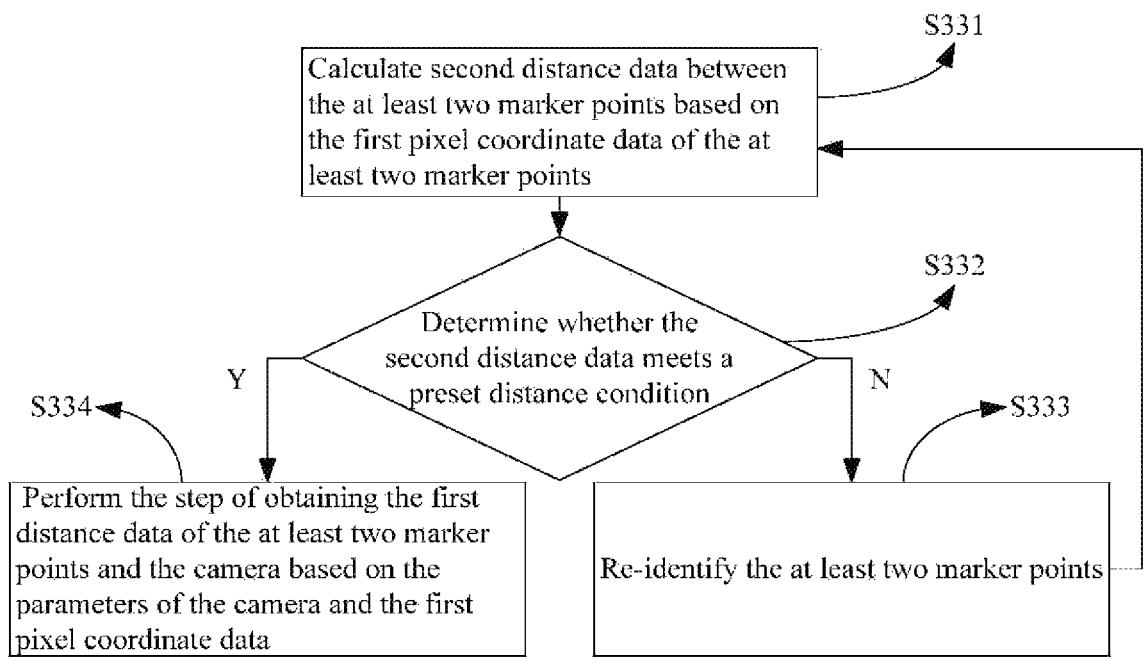
FIG. 6 is a flow chart of a third embodiment of a positioning method according to the present disclosure.

The present disclosure further provides still another positioning method. FIG. 6 is a flow chart of a third embodiment of a positioning method according to the present disclosure. In this embodiment, the positioning method is also applied to the robot 200. For the structure of the robot 200, please refer to FIG. 2, which is not described herein.

As shown in FIG. 6, based on the third embodiment, after step S33, the method further includes the following steps.

S331: calculating second distance data between the at least two marker points based on the first pixel coordinate data of the at least two marker points.

In this embodiment, the robot 200 calculates the second distance data between the marker points, that is, the actual spatial distance, based on the first pixel coordinate data of the identified adjacent marker points.

For instance, if the identified marker points are on a same straight line, the robot 200 only obtains the data of the marker points at the left and right ends; if the identified marker points are not on the same straight line, the robot 200 obtains the data of the three marker point which includes the data of the marker points at the left and right ends and the data of the marker points with the farthest distance with respect to the marker points at the left and right ends, thereby improving the calculation accuracy of the position of the robot 200.

S332: determining whether the second distance data meets a preset distance condition.

In this embodiment, the second distance data, that is, the actual spatial distance between two marker points, is determined to be within a preset distance range or not. If yes, step S334 is executed; otherwise, step S333 is executed. The preset distance is a criterion for obtaining the marker points. If the actual spatial distance of the marker points obtained by the robot 200 is without the preset distance range, the accuracy of the first distance data between the marker points and the camera which is calculated by using the marker points will be lower. Therefore, the robot 200 needs to obtain two or more marker points whose actual spatial distance is within the preset distance range, thereby improving the accuracy of the calculation.

S333: re-identifying the at least two marker points if the second distance data is determined as not meeting the preset distance condition.

In this embodiment, if the second distance data is determined as not meeting the preset distance condition, the robot 200 discards the two marker points and re-identifies the other marker points, and re-determines through steps S331 and S332 until the spatial distances of the two obtained marker points meet the preset distance condition.

S334: performing the step (S34) of obtaining the first distance data of the at least two marker points and the camera based on the parameters of the camera and the first pixel coordinate data if the second distance data is determined as meeting the preset distance condition.

Based on the positioning method of the second embodiment, in this embodiment, a condition determination is performed on the obtained marker points to ensure that the actual spatial distance of the marker points is within the preset distance range so as to improve the accuracy of the robot position calculation.

Figure 7:
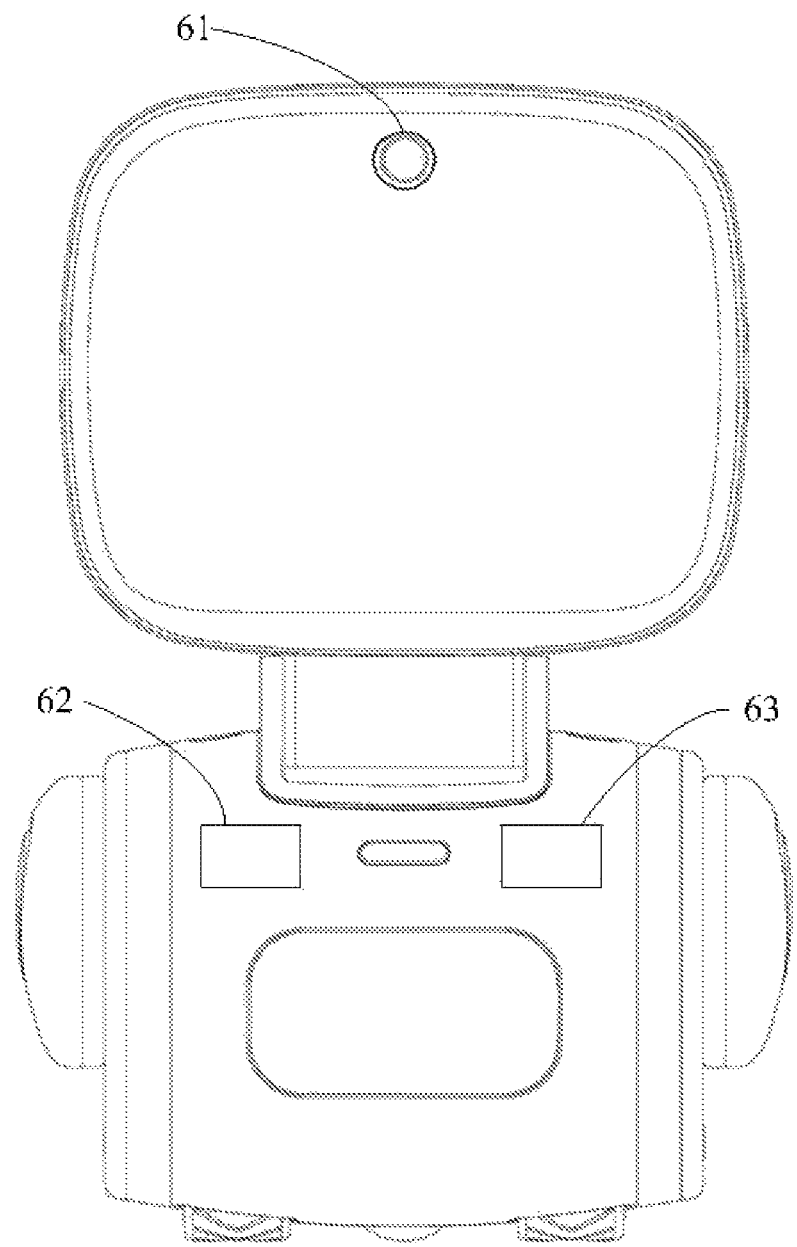
FIG. 7 is a schematic block diagram of an embodiment of a robot according to the present disclosure.

The present disclosure further provides a robot. FIG. 7 is a schematic block diagram of an embodiment of a robot according to the present disclosure. As shown in FIG. 7, a robot 600 which is the similar to the robot 200 disclosed in the above-mentioned embodiment of the positioning method is provided. The robot 600 includes at least a camera 61, a storage 62, a processor 63, and one or more computer programs. The processor 63 is coupled to each of the camera 61 and the storage 62.

The camera 61 configured to take photos of a predetermined area, where the predetermined area includes a marker pattern area.

The one or more computer programs are stored in the storage 62 and executable on the processor 63, where the one or more computer programs include instructions for identifying at least two marker points of the marker pattern area to obtain first coordinate data of each marker point; calculating second coordinate data of the robot in a world coordinate based on parameters of the camera and the first coordinate data of the at least two marker points; and calculating angle data of the robot in the world coordinate based on the first coordinate data of the at least two marker points and the second coordinate data of the robot in the world coordinate.

The storage 62 (e.g., a memory) is configured to store data for the processor 63 and the camera 61 including camera parameters, photo data, the first coordinate data of the marker points, the second coordinate data of the robot 600 in the world coordinate, the angle data of the robot 600 in the world coordinate, and the like.

In this embodiment, the processor 63 may also be known as a central processing unit (CPU). The processor 63 may be an integrated circuit chip with signal processing capability. The processor 63 may also be a general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor 63 may also be any conventional processor.

Figure 8:
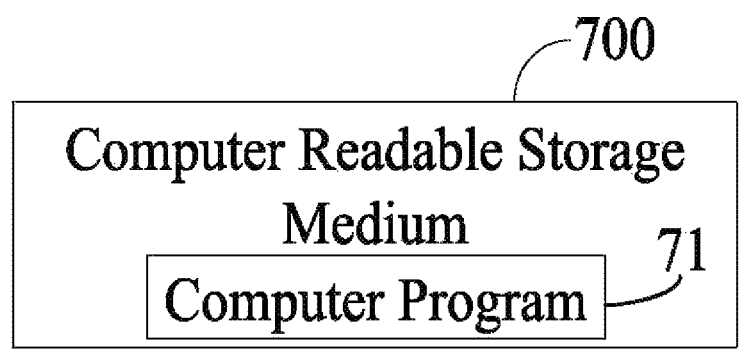
FIG. 8 is a schematic block diagram of an embodiment of a non-transitory computer readable storage medium according to the present disclosure.

The present disclosure further provides a non-transitory computer readable storage medium. FIG. 8 is a schematic block diagram of an embodiment of a non-transitory computer readable storage medium according to the present disclosure. As shown in FIG. 8, a non-transitory computer readable storage medium 700 is configured to store a computer program 71 that can be executed to implement the steps of the positioning methods in the above-mentioned embodiments.

In the present disclosure, the methods involved in the embodiments of the positioning method may be stored in the medium 700 if it is implemented in the form of a software functional unit and sold or utilized as a separate product. Based on this understanding, the technical solution of the present disclosure, either essentially or in part, contributes to the prior art, or all or a part of the technical solution can be embodied in the form of a software product. The software product is stored in a storage medium, which includes a number of instructions for enabling a computer device (which can be a personal computer, a server, a network device, etc.) or a processor to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented positioning method for a robot having a camera, the method comprises executing on a processor of the robot the steps of:
    taking a photo of a predetermined area, wherein the predetermined area comprises a marker pattern area;
    identifying at least two marker points of the marker pattern area and obtaining first coordinate data of each marker point;
    calculating second coordinate data of the robot in a world coordinate based on parameters of the camera and the first coordinate data of the at least two marker points; and
    calculating angle data of the robot in the world coordinate based on the first coordinate data of the at least two marker points and the second coordinate data of the robot in the world coordinate;
wherein the first coordinate data comprises first pixel coordinate data and first physical coordinate data of the at least two marker points in the world coordinate, and the first pixel coordinate data is data of a two-dimensional coordinate of the each marker point in a pixel coordinate system;
the step of calculating the second coordinate data of the robot in the world coordinate based on the parameters of the camera and the first coordinate data of the at least two marker points comprises:
    obtaining first distance data of the at least two marker points and the camera based on the parameters of the camera and the first pixel coordinate data; and
    calculating the second coordinate data of the robot in the world coordinate based on the first distance data and the first physical coordinate data of the marker point in the world coordinate;
the step of calculating the angle data of the robot in the world coordinate based on the first coordinate data of the at least two marker points and the second coordinate data of the robot in the world coordinate comprises:
    calculating the angle data of the robot in the world coordinate based on the first physical coordinate data of the at least two marker points in the world coordinate and the second coordinate data of the robot in the world coordinate;
wherein the marker pattern area comprises a marker point and an encoded pattern;
the step of identifying the at least two marker points of the marker pattern area and obtaining n the first coordinate data of the at least two marker points comprises:
    identifying the at least two marker points of the marker pattern area and obtaining the first pixel coordinate data of the at least two marker points;
    identifying the encoded pattern between the at least two marker points of the marker pattern area to obtain encoded data corresponding to the encoded pattern; and
    searching the first physical coordinate data of the at least two marker points adjacent to the encoded pattern in the world coordinate corresponding to the encoded data from a pre-stored record;
wherein the encoded pattern comprises at least two code blocks;
the step of identifying the encoded pattern between the at least two marker points of the marker pattern area to obtain the encoded data corresponding to the encoded pattern comprises:
    identifying a color, an amount, and/or an arrangement order of the code blocks between the at least two marker points of the marker pattern area to obtain the encoded data corresponding to the encoded pattern;
wherein the robot is placed on the marker pattern area of a marking tool, and the marking tool is a marking plate or marking paper having a checkerboard; and
wherein the checkerboard is provided in an inner contour of the marker pattern area, the robot is placed at a center intersection or any intersection of the checkerboard, a plurality of marker points are provided in an outer contour of the marker pattern area, at least three code blocks are disposed between each two marker points, the at least three code blocks comprise at least one first code block and at least two second code blocks, and a number of the at least two second code blocks is greater than a number of the at least one first code block.

2. The method of claim 1, wherein before the step of taking the photo of the predetermined area comprises:
calibrating the camera and obtaining the parameters of the camera, wherein the parameters of the camera comprise at least a focal length, a resolution, and a magnification.

3. The method of claim 2, wherein the step of taking the photo of the predetermined area comprises:
taking, by the camera, the photo of the predetermined area at a predetermined angle with respect to a bottom of the robot, wherein the predetermined angle is less than 90°.

4. The method of claim 1, wherein after the step of identifying the at least two marker points of the marker pattern area and obtaining the first pixel coordinate data of the at least two marker points further comprises:
calculating second distance data between the at least two marker points based on the first pixel coordinate data of the at least two marker points;
determining whether the second distance data meets a preset distance condition;
re-identifying the at least two marker points in response to determining the second distance data as not meeting the preset distance condition; and
performing the step of obtaining the first distance data of the at least two marker points and the camera based on the parameters of the camera and the first pixel coordinate data in response to determining the second distance data as meeting the preset distance condition.

5. The method of claim 4, wherein the step of calculating the second coordinate data of the robot in the world coordinate based on the first distance data and the first physical coordinate data of the marker point in the world coordinate comprises:
calculating the second coordinate data of the robot in the world coordinate through a trilateral positioning method based on the first distance data and the first physical coordinate data of the at least two marker points in the world coordinate.

6. The method of claim 4, wherein if the at least two marker points are on a same straight line, data of marker points at left and right ends is obtained for calculating the second distance data, and if the at least two marker points are not on the same straight line, data of three marker points is obtained for calculating the second distance data, wherein the data of three marker points comprises the data of marker points at the left and right ends and data of marker point with a farthest distance with respect to the marker points at the left and right ends.

7. The method of claim 1, wherein a marker point is provided in each of four vertices of the outer contour of the marker pattern area, a number of the code blocks between each two adjacent marker points is same, a distance between each two adjacent marker points is same or different, and a distance between each two adjacent code blocks is same or different; and
wherein the first code block and the second code block are distinguished by color when shapes of the first code block and the second code block are same, the first code block and the second code block are distinguished by shape when colors of the first code block and the second code block are same, and an arrangement order of the code blocks is calculated in binary.

8. The method of claim 1, wherein the step of taking the photo of the predetermined area comprises:
obtaining photos of the marker pattern area from different angles and different distances, wherein at least a part of a marker pattern is shown in the photos.

9. The method of claim 1, wherein the parameters of the camera comprise: internal parameters and external parameters, the internal parameters comprise feature parameters of the camera and configured parameters of the camera at a time of taking the photo, and the external parameters comprise a positional relationship between an optical center of the camera and a robot coordinate of the robot.

10. A robot, comprising:
a camera configured to take a photo of a predetermined area, wherein the predetermined area comprises a marker pattern area;
a memory;
a processor coupled to the camera and the memory; and
one or more computer programs stored in the memory and executable on the processor, wherein the one or more computer programs comprise:
instructions for identifying at least two marker points of the marker pattern area and obtaining first coordinate data of each marker point; calculating second coordinate data of the robot in a world coordinate based on parameters of the camera and the first coordinate data of the at least two marker points; and calculating angle data of the robot in the world coordinate based on the first coordinate data of the at least two marker points and the second coordinate data of the robot in the world coordinate;
wherein the first coordinate data comprises first pixel coordinate data and first physical coordinate data of the at least two marker points in the world coordinate, and the first pixel coordinate data is data of a two-dimensional coordinate of the each marker point in a pixel coordinate system;
the instructions for calculating the second coordinate data of the robot in the world coordinate based on the parameters of the camera and the first coordinate data of the at least two marker points comprise:
instructions for obtaining first distance data of the at least two marker points and the camera based on the parameters of the camera and the first pixel coordinate data; and
instructions for calculating the second coordinate data of the robot in the world coordinate based on the first distance data and the first physical coordinate data of the marker point in the world coordinate;
the instructions for calculating the angle data of the robot in the world coordinate based on the first coordinate data of the at least two marker points and the second coordinate data of the robot in the world coordinate comprise:
instructions for calculating the angle data of the robot in the world coordinate based on the first physical coordinate data of the at least two marker points in the world coordinate and the second coordinate data of the robot in the world coordinate;
wherein the marker pattern area comprises a marker point and an encoded pattern;
the instructions for identifying the at least two marker points of the marker pattern area and obtaining the first coordinate data of the at least two marker points comprise:
instructions for identifying the at least two marker points of the marker pattern area and obtaining the first pixel coordinate data of the at least two marker points;

instructions for identifying the encoded pattern between the at least two marker points of the marker pattern area to obtain encoded data corresponding to the encoded pattern; and instructions for searching the first physical coordinate data of the at least two marker points adjacent to the encoded pattern in the world coordinate corresponding to the encoded data from a pre-stored record;

wherein the one or more computer programs further comprise:

instructions for calculating second distance data between the at least two marker points based on the first pixel coordinate data of the at least two marker points;

instructions for determining whether the second distance data meets a preset distance condition;

instructions for re-identifying the at least two marker points in response to determining the second distance data as not meeting the preset distance condition; and instructions for performing the step of obtaining the first distance data of the at least two marker points and the camera based on the parameters of the camera and the first pixel coordinate data in response to determining the second distance data as meeting the preset distance condition; and wherein if the at least two marker points are on a same straight line, data of marker points at left and right ends is obtained for calculating the second distance data, and if the at least two marker points are not on the same straight line, data of three marker points is obtained for calculating the second distance data, wherein the data of three marker points comprises the data of marker points at the left and right ends and data of marker point with a farthest distance with respect to the marker points at the left and right ends.

11. The robot of claim 10, wherein the one or more computer programs further comprise:

instructions for calibrating the camera and obtaining the parameters of the camera, wherein the parameters of the camera comprise at least a focal length, a resolution, and a magnification.

12. The robot of claim 11, wherein the instructions for taking the photo of the predetermined area comprise:

instructions for taking, by the camera, the photo of the predetermined area at a predetermined angle with respect to a bottom of the robot, wherein the predetermined angle is less than 90°.

13. The robot of claim 10, wherein the encoded pattern comprises at least two code blocks;

the instructions for identifying the encoded pattern between the at least two marker points of the marker pattern area to obtain the encoded data corresponding to the encoded pattern comprise:

instructions for identifying a color, an amount, and/or an arrangement order of the code blocks between the at least two marker points of the marker pattern area to obtain the encoded data corresponding to the encoded pattern.

14. The robot of claim 10, wherein the instructions for calculating the second coordinate data of the robot in the world coordinate based on the first distance data and the first physical coordinate data of the marker point in the world coordinate comprise:

instructions for calculating the second coordinate data of the robot in the world coordinate through a trilateral positioning method based on the first distance data and the first physical coordinate data of the at least two marker points in the world coordinate.

* * * * *